(12) United States Patent
Patel et al.

(10) Patent No.: US 7,953,731 B2
(45) Date of Patent: May 31, 2011

(54) ENHANCING AND OPTIMIZING ENTERPRISE SEARCH

(75) Inventors: Alpesh S. Patel, Morrisville, NC (US); Gilbert C. Yu, Cupertino, CA (US); Marshall Uy Alexander, Pleasanton, CA (US); Stephen Joseph Moffett, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 355 days.

(21) Appl. No.: 11/942,498

(22) Filed: Nov. 19, 2007

(65) Prior Publication Data

US 2009/0132516 A1  May 21, 2009

(51) Int. Cl.
*G06F 17/30* (2006.01)
(52) U.S. Cl. ........................... 707/723; 707/748
(58) Field of Classification Search .............. 707/1–10, 707/706, 723, 724, 729, 748
See application file for complete search history.

(56) References Cited

U.S. PATENT DOCUMENTS

| | | | | |
|---|---|---|---|---|
| 6,493,702 | B1 * | 12/2002 | Adar et al. | 707/3 |
| 7,031,961 | B2 * | 4/2006 | Pitkow et al. | 707/4 |
| 7,634,463 | B1 * | 12/2009 | Katragadda et al. | 1/1 |
| 7,634,465 | B2 * | 12/2009 | Sareen et al. | 1/1 |
| 2007/0185864 | A1 * | 8/2007 | Budzik et al. | 707/5 |
| 2008/0010252 | A1 * | 1/2008 | Zamir et al. | 707/3 |
| 2008/0162425 | A1 * | 7/2008 | Grennan et al. | 707/3 |
| 2008/0201320 | A1 * | 8/2008 | Hong et al. | 707/5 |

* cited by examiner

*Primary Examiner* — Cam-Linh Nguyen
(74) *Attorney, Agent, or Firm* — Patterson & Sheridan, LLP

(57) ABSTRACT

Embodiments of the invention improve the quality of search results returned for a given set of search terms based on metadata associated with the user performing the search. A search query may specify metadata elements to consider in ranking the search results. The metadata used may include bookmarks set by the user (either locally or at a social bookmaking site), group bookmarks, etc. In such a case, search results may be reordered to improve the ranking of websites that are both in the search results and in the bookmarks.

19 Claims, 6 Drawing Sheets

FIRST CLIENT BROWSER

SECOND CLIENT BROWSER

ENHANCING AND OPTIMIZING ENTERPRISE SEARCH

BACKGROUND OF THE INVENTION

1. Field of the Invention

Embodiments of the present invention generally relate to enhanced search engine techniques, and more specifically a method and apparatus for enhancing and optimizing enterprise search.

2. Description of the Related Art

Search techniques have been developed that allow a user to enter search terms into a browser and send those search terms to a search engine. The search engine may evaluate the search terms against an index and produce a list of results. Typically, the results provide a list of web pages that contain the search terms. A ranking algorithm is then used to order the results in such a way that the first results listed might be the "best" results that include the search terms. One well-known example is ordering the results based on the number of links associated with each result. After the search results are ordered, the ordered results are returned and displayed on a web browser.

One problem with this approach is that often times newer, more relevant search results are ranked lower than older results because these pages have less links associated with them, although the newer search results may be more popular or more relevant at the current time. Another disadvantage is that a user might enter a search query which produces many pages of search results. Then, the user must sort through many results in order to find what is relevant for that particular user. The results returned may be ordered in terms of popularity of all users as a whole and not tailored to any kind of subgroup of users or to the needs of that particular user.

Accordingly, what is needed is a technique for producing search results that are ranked such that the results that are most relevant to the particular user may be found at the top of the ranked list of search results.

SUMMARY OF THE INVENTION

Embodiments of the invention may be used to enhance information retrieval techniques using a multiple-phase search system. More specifically, embodiments of this invention optimize the ranking of search results for relevance to a particular user. The multiple-phase search may be used to prioritize more static search results with dynamic information collected in real-time.

In a first phase of a search, an index is used to identify a set of search results containing a set of search terms. The set of search results may be ranked using a ranking algorithm. In a second phase of the search, the ranking of some entries in the list may be modified, based on metadata associated with the user submitting the search. For example, sites bookmarked by a user, either on that user's computer or at a social book marking site may indicate websites important to the user. Accordingly, the bookmarks may be used to identify pages in a list of search results that may have particular relevance to a user. Thus, two users may provide the same search terms to the search engine, but receive different results, based on the bookmarks associated with each individual user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention may be used to improve the quality of search results returned for a given set of search terms. Specifically, embodiments of this invention optimize the ranking of search results for relevance to a particular user. In one embodiment, a user may enter a search query into a browser and select what metadata related to the user to use in adjusting the ranking of certain cites that may appear in the search results. For example, metadata used to enhance search results may include bookmarks set by the user (either locally or at a social book-marking site), group bookmarks of a group of users within an enterprise, quality of service metadata, and geographic location metadata. Of course, other information reflected in metadata could be used to dynamically evaluate a set of search results. In one embodiment, after a primary search engine determines an initial set of search results (e.g., based on websites that include a set of search terms), the results are processed by additional logic within the search engine that allows for a secondary processing of the results. For illustrative purposes, this additional logic is depicted as a secondary search engine. However, persons skilled in the art would understand that the additional logic may be implemented within the primary search engine. The secondary search process may modify the ordering of the search results to improve the ranking of some entries based on the bookmarks or other metadata.

Figure 1:
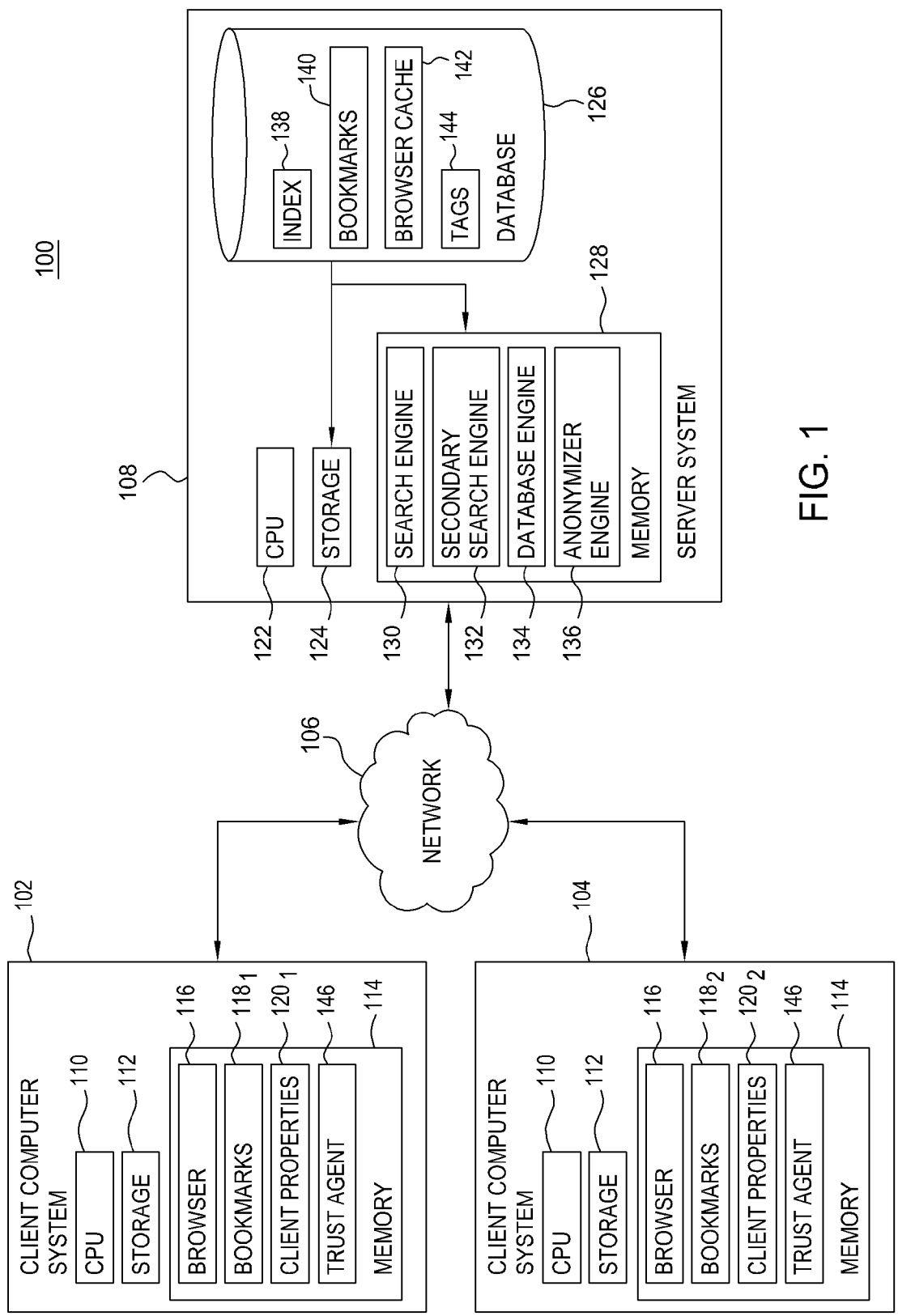
FIG. 1 is a block diagram illustrating a client server view of a computing environment and database system, according to one embodiment of the invention.

FIG. 1 is a block diagram that illustrates a client server view of computing environment 100, according to one embodiment of the invention. As shown, computing environment 100 includes two client computer systems 102 and 104, network 106 and server system 108. The computer systems 102, 104, and 108 illustrated in environment 100 are included to be representative of existing computer systems, e.g., desktop computers, server computers laptop computers, tablet computers, as well as internet routers, switches and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 102 and 104 each include a CPU 110, storage 112, and memory 114, typically connected by a bus (not shown). CPU 110 is a programmable logic device that performs all the instructions, logic, and mathematical processing performed in executing user applications (e.g., a browser 116). Storage 112 stores application programs and data for use by client computer systems 102 and 104. Storage 112 includes hard-disk drives, flash memory devices, optical media, network and attached storage devices, and the like. Network 106 generally represents any kind of data communications network. Accordingly, network 106 may represent both local and wide area networks, including the Internet.

Client computer systems 102 and 104 also include a browser 116. In one embodiment, browser 116 provides a software application that allows users to view web pages and to create, read, update, and delete bookmarks stored in a database (e.g., local bookmarks 118 or bookmarks 140 in database 126). The web pages may include HTML documents, but may also include any document accessed (or accessible through) browser 116. For example, PDF files, spread sheets, word processing documents, multi-media files, digital images, etc., may all be accessed through browser 116 using a URI (uniform resource identifier). Thus, references herein to web pages should be read to include any information, in whatever form, listed in search results. Browser 116 may also allow users to access a search engine 130 and submit a search query to a search engine 130. In response, search engine 130 may be configured to return a list of search results. Client computer systems 102 and 104 also contain saved bookmarks 118 in the memory 114, which are links to documents that each user finds particularly relevant. These bookmarks, as well as cache from the browser 116, may be sent to the server 108 and stored in the database 126 using software 146 located in the client computer systems 102 and 104. When bookmarks are deleted on the client computer systems 102 and 104, they may still exist in a database 126 until the database is updated.

Server 108 includes a CPU 122, storage 124, and a memory 128. As shown, server computer 108 also includes a database management system (DBMS) that includes a database engine 134. Database engine 134 may be used to create, retrieve, update and delete data from database 126, and also be used to perform other database operations. In one embodiment, some actions performed by database engine 134 may be controlled via the browser 116.

At various times, elements of database 126 may be present in storage 124 and memory 128. In one embodiment, database 126 includes bookmarks 140, browser cache 142, and an index 138. The index 138 may be used to identify a list of web pages that include a set of search terms submitted by a user. The list of web pages may be ranked by search engine 130. The bookmarks 140 and/or browser cache 142 may be uploaded from individual users as they use the enhanced search feature. Bookmarks 140 and/or browser cache 142 for a user may be kept current by a check performed during an enhanced search performed by that user, and updated as necessary. Database 126 may also store tags 144 associated with web pages and created by a user. The user may mark content with tags descriptive of the content. For example, a user could mark a webpage related to cryptography with the tags "network security." Tags may be updated in the database as they are created. It is not necessary to update the tags upon performing an enhanced search. Further, the tags assigned to a given document may evolve over time. In one embodiment, a trust agent 146 may be configured to transfer bookmarks, cache information and/or "cookies" placed by web pages while a user browses a given web page using browser 116. Trust agent 146 may provide a software application configured to capture a given user's bookmarks (and/or other data), and securely transfer this information to database 126 over network 106. Trust agent 146 may be implemented as a browser plug-in or as an independent software application or process.

To perform a search, a user enters a search query into a search-engine web page rendered on browser 116. The search engine 130 receives the search terms and returns search results to the browser 116, ranked in an order of the global popularity of the results. In one embodiment of the present invention, before the ranked results are returned to a browser 116, the results may be ranked again by a secondary search engine 132. The secondary search engine 132 may be configured to reorder the search results using other data regarding the user who submitted a given search. For example, bookmarks 118 or client properties 120 may be used to increase the ranking of a web page included in the search results provided by search engine 130. Client properties 120 may specify a device type or other characteristics of client system 102, 104. Thus, the highest ranked results may be more relevant for the particular user. For illustrative purposes, the secondary search engine 132 is depicted as part of the server 108. However, in an alternative embodiment, the search engine on the local machine can use metadata to prioritize search results based on that user's information on that machine. Because web pages that the user deemed generally important enough to bookmark include the search terms, ranking these pages at (or near) the top of the ranked search results may provide higher quality of search results. The bookmarks may be found in the user's saved bookmarks 118 or stored in the database 126. Illustratively, memory 128 in the server 108 also contains an anonymizer engine 136. In one embodiment, anonymizer engine 136 may be used when uploading bookmarks from individual clients 102 and 104 into the database 126. Before bookmarks 118 from the clients 102 and 104 are added to the bookmarks saved in the database, they may be processed by an anonymizer engine 136 to ensure that the identity of the source of individual bookmarks remains anonymous.

In one embodiment, a group of users may be associated with one another and secondary search engine 132 may use this association to further enhance a search. For example, some groups of users which would be useful in enhancing search results include employer, employee workgroup within an enterprise, common interest, networks of friends or family, etc. Thus, within an enterprise, the bookmarks of a related group of users may be used to enhance the ranking of web pages included in search results for any member of the group. This may be particularly useful for searching enterprise intranets, where search engine 130 may do a poor job of ranking search results because few pages link to other pages. In such a case, the most relevant pages may be ones bookmarked by the user (or collectively, the group of users). Web pages that are relevant to others users in the group (as reflected in bookmarks or tags) may be more likely to be relevant to the user initiating the enhanced search. Further, pages bookmarked recently may be more relevant than ones bookmarked in the past. In each of these scenarios, the ranking of search results by search engine 130 may be reordered by secondary search engine 132 to dynamically enhance the quality of search results for the users, based on the bookmarks or tags of the user or group of users.

Figure 2:
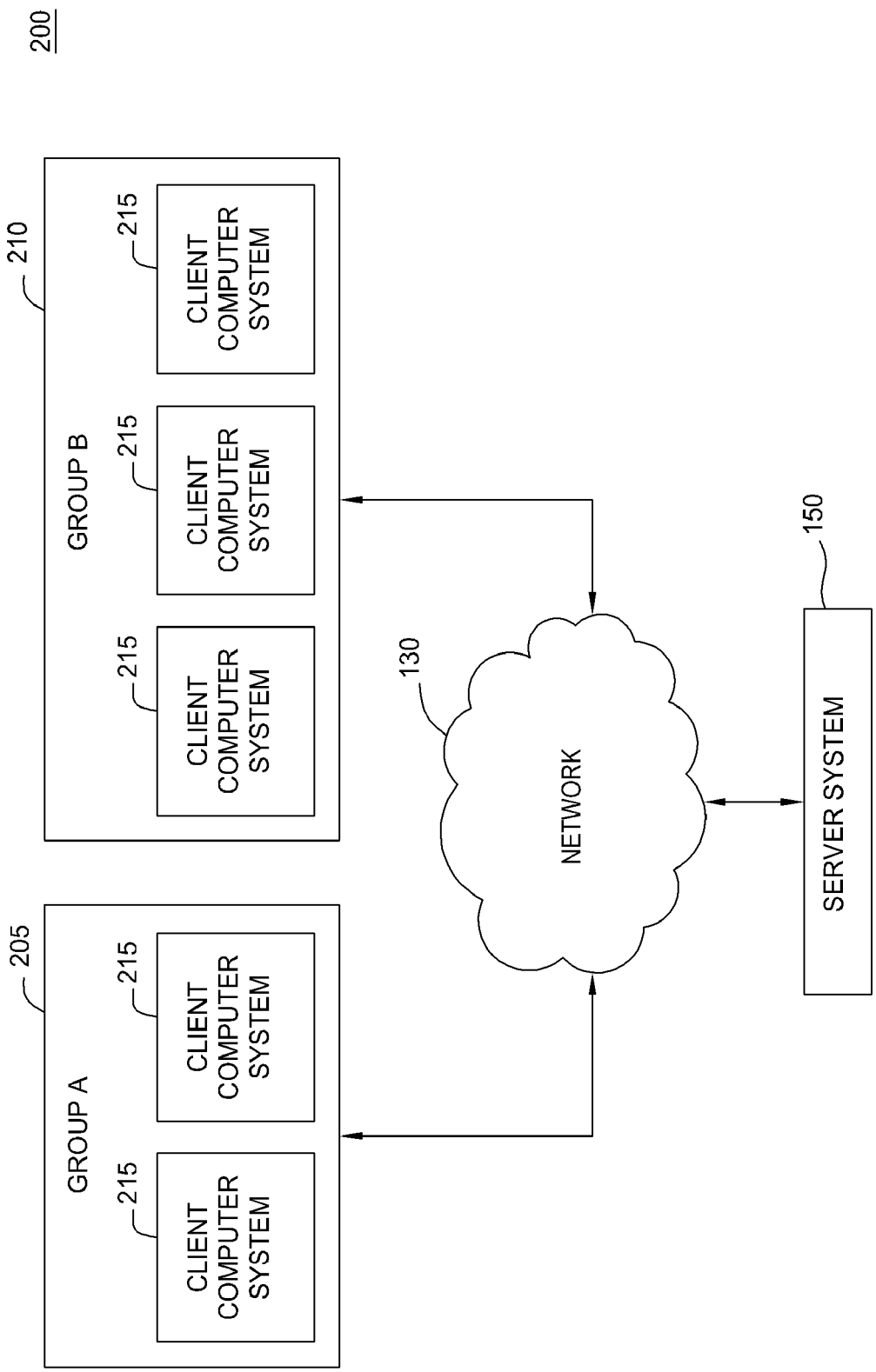
FIG. 2 is a block diagram illustrating a client server view of a computing environment where clients are identifiable by client group.

FIG. 2 is a block diagram that illustrates a client server view of a computing environment 200, according to one embodiment of the invention. As shown, client computer systems 215 are associated with each other in groups 205 and 210. Each client computer system 215 is connected across a network 130 and to a server 150. The server 150 may contain a database that stores information from several users which may be associated with each other. In one embodiment, as each user performs an enhanced search, their bookmarks, along with data associating that user with a particular group or groups, may be uploaded to the database and may be accessed to enhance search results for subsequent searches.

Figure 3:
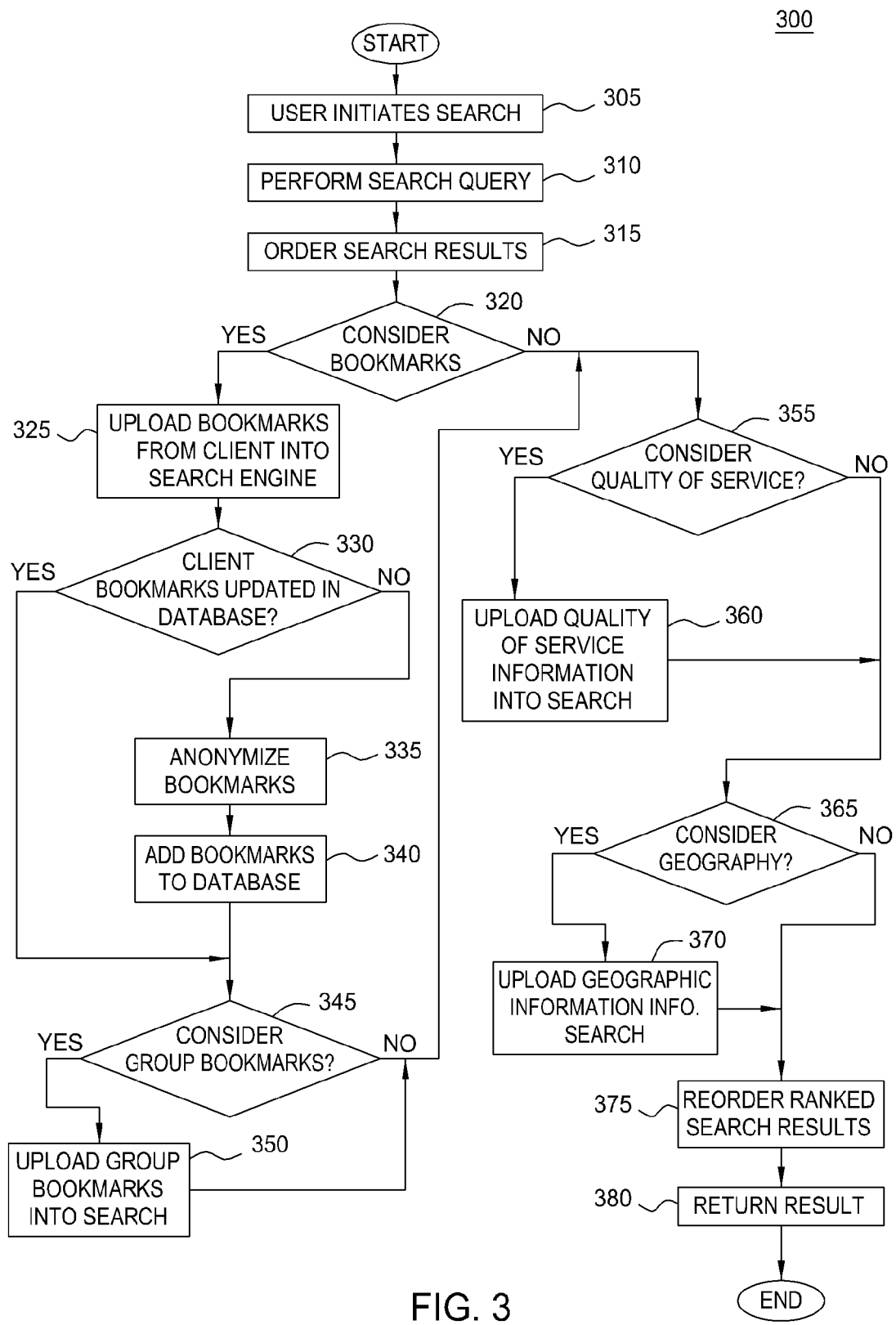
FIG. 3 is a flow diagram illustrating a method for performing a two phase enhanced search, according to one embodiment of the invention.

FIG. 3 is a flow diagram 300 illustrating a method for a two phase enhanced search, according to one embodiment of the invention. At step 305, a user initiates a search by entering search terms into a browser. At step 310, the search terms are sent to a search engine which, in response, may be configured to identify a list of search results (i.e., a list of web pages and/or other documents) that contain the search terms submitted in the search terms received at step 305. For example, the search engine may be configured to look up each search term in an index. The index maps individual terms to web pages that contain a given term. By intersecting the set of web pages that include each individual term, a set of web pages that contain all terms may be determined. At step 315, the results in the list are ranked. The ranking may be based on link analysis, links to each given page in the result, manually ranked, or ranked based according to any other ranking scheme or criteria. This completes the first phase of the enhanced search method.

After the first phase, the search results may be sent to a secondary search engine. At step 320, the secondary search engine may determine whether the user has selected to consider bookmarks in ranking search results. If so, the secondary search engine may determine whether bookmarks from that user are uploaded into the search engine. It not, at step 325, the user's bookmarks may be uploaded to the search engine for evaluating the search results. As stated, the bookmarks may be obtained directly from the user, from a social-bookmarking site based on the identity of the user, and further, may include bookmarks for a related group of individuals that includes the user.

At step 330, the search engine may determine whether the bookmarks uploaded at step 325 are current. If not, the bookmarks may be refreshed. The time period before existing bookmarks are considered "stale" may be a matter of preference set for the secondary search engine. Typically, however, bookmarks (like the web pages they represent) may remain good for a substantial period of time. Optionally, an anonymizer engine may be configured to anonymize the bookmarks and browser cache, and to add the anonymous bookmarks and browser cache to the database. The anonymization process allows for many users' bookmarks or cache to be saved and used by other users in an enhanced search without revealing the identity of an individual user associated with the meta-data. Referring back to step 330, if the bookmarks were up to date with the bookmarks stored in the database, then method 300 proceeds from step 330 to step 345. At step 345, the secondary search engine determines whether bookmarks from other users are associated with the user who submitted the query initiated at step 305. If the query specified that the user wants bookmarks related to a group of users to be considered, then at step 350, those other bookmarks are also loaded into the secondary search engine.

Otherwise, or after performing step 350, method 300 processes to step 355. At step 355, the secondary search engine determines whether the quality of service of the client should be considered in ranking search results. If so, at step 360, the quality of service information relevant to the search currently being performed is loaded into the secondary search engine. The search engines 130 and 132 may determine where a given search request is sent from, typically, identified by an IP address. In one embodiment, search engines 130 and 132 may be configured to track the quality of service on the network path between client 102 and the source of a given document. For example, if a user is coming from a dialup connection, search results containing high definition videos would be of less priority than smaller result, so the secondary search engine notes the dialup connection, and may adjust search results accordingly. In such a case, the secondary search engine may rank the results with high definition video much lower than search engine 130 which may be unable to account for this type of metadata. Generally, quality of service metadata may be determined when the user submits the search request. That is, the quality of service metadata may be based on the existing network state at the time a search request is submitted. If the meta-data says prioritize based on quality of service, the search engine "queries" the network to find the current Quality of service and prioritizes results accordingly.

After step 355, or if quality of service is not considered, the secondary search engine determines whether geographic information should be considered in ranking search results at step 365. If the user has selected to consider geographic information, geographic information is loaded into the secondary search engine. In one embodiment of the invention, geographic information may be found by the IP address of the user. Loading information about the geographic location of the user into the secondary search engine would allow for results about that geographic location to be given higher priority than results about other or more general geographic locations. Similarly, another type of metadata may be based on the characteristics or type of device that is used to connect to search engines 130 and 132. For example, the characteristics of a mobile phone or handheld differ from a laptop or desktop computer. Accordingly, in one embodiment, the secondary search engine may re-rank search results to promote (or demote) results appropriate for one type of device over another.

At step 375, the search results ordered at step 315 may be reordered, based on the bookmark information, quality of service data information, or geographic information, device type and/or characteristics as appropriate in any given case. For example, assume that a web-page bookmarked by the user (or friends, co-workers, or peers of the user) is included in the search performed at step 310, but that this page was ordered at or near the bottom the results at step 315. In such a case, at step 375, the secondary search engine may recognize that this may be particularly relevant to this user (based on the bookmark) and reorder the search results accordingly. In one embodiment, the search result may be ordered by a score assigned by the primary search engine. In such a case, the secondary engine may add an amount to the score of the bookmarked page. Alternatively, the secondary search engine may simply move the webpage to the first position of the order. Of course, one of ordinary skill in the art may recognize that secondary search engine may reorder the search results in a variety of ways. Finally, in step 380, the results are returned to the browser.

Figure 4:
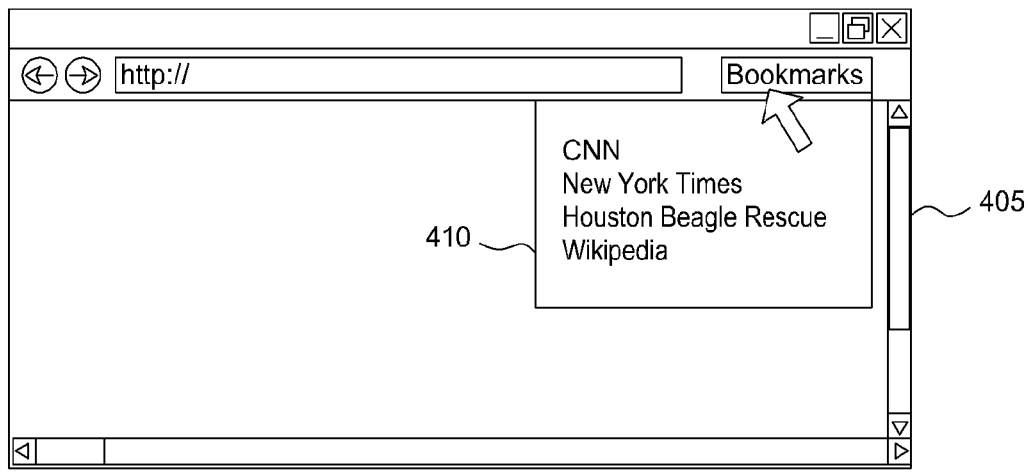
FIG. 4 illustrate two screenshots where bookmarks may be found in the browsers of two users and examples of those bookmarks, according to one embodiment of the invention.
Figure 4:
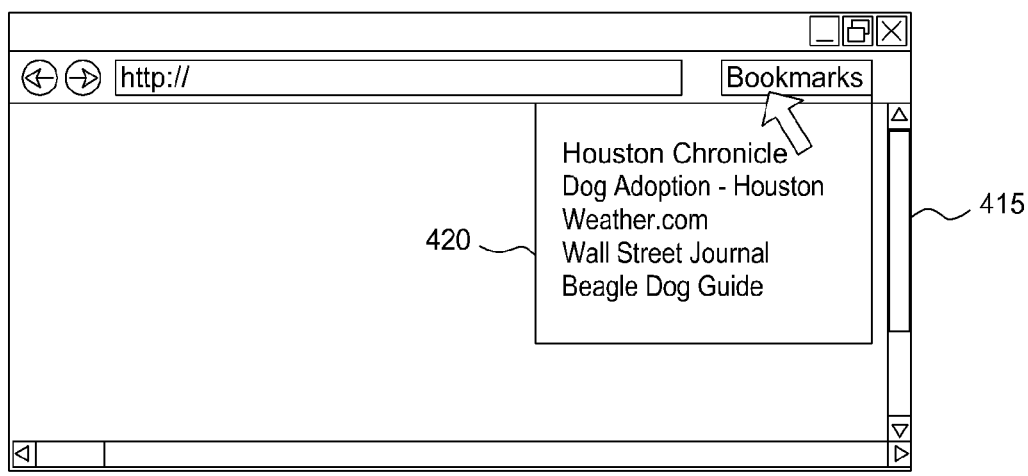
Figure 5:
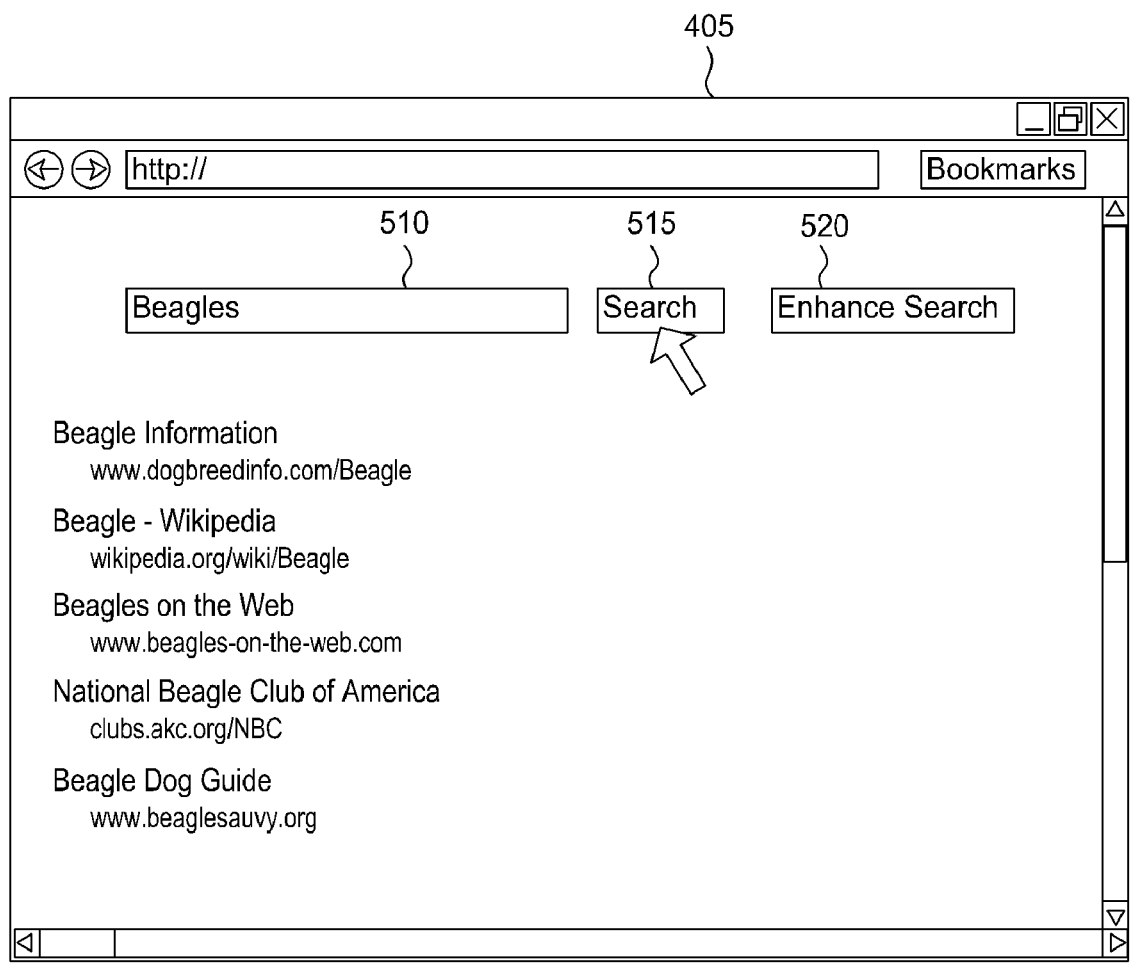
FIG. 5 illustrates a screenshot of search results returned using traditional search methods.
Figure 6:
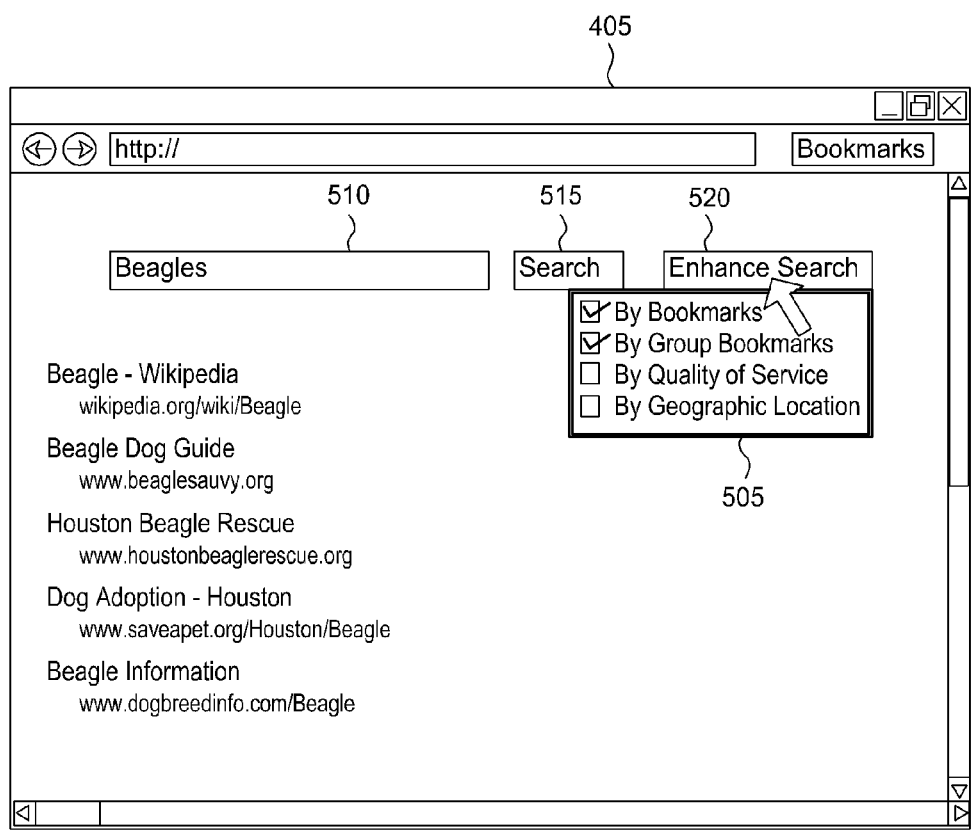
FIG. 6 illustrates a screenshot of search results returned using the same search terms as FIG. 5, using an enhanced search method, according to one embodiment of the invention.

FIGS. 4-6 illustrate an example of a pair of users associated in a network, where one user conducts a traditional search and an enhanced search using the same search terms. These figures provide an example of how the order of search results may differ based on the selection of enhanced search. FIG. 4 illustrates a first screen shot 405 and a second screen shot 415 of two users' browsers indicating their respective bookmarks 410 and 420. Note, the user of browser 405 has a bookmark for a web site titled "Houston Beagle Rescue," and the user of browser 410 has a bookmark for web sites titled "Dog Adoption Houston" and "Beagle Dog Guide." Assume the users of browsers 405 and 415 may be associated with each other (e.g., as employees within an enterprise, friends, or members of a shared-bookmark group on a social bookmaking site). In one embodiment, when the user of browsers 405 or 415 performs a search, if one (or more) of the bookmarked web sites is present in the results obtained from a primary search engine, a secondary search engine may increase a ranking or score for such web sites.

The user of browser 405 may initiate a search by supplying search terms to a web page associated with a search engine. FIG. 5 illustrates a screenshot of search results returned using traditional search methods. As shown, a user has entered the search term "beagles" in a text box 510. Illustratively, the user may choose to implement a traditional search using a search button 515 or an enhanced search using an enhanced search button 520. FIG. 5 also shows a list of search results 525 returned to browser 405 after a traditional search has been completed using the search term "beagles."

As ordered in FIG. 5, search results 525 list the site "Beagle Dog Guide" as the last one in the results. That is, the ranking performed by the primary search engine has ranked the "Beagle Dog Guide" web site as the least important or relevant one in the list. However, as illustrated in the bookmarks 420 of FIG. 4, the "Beagle Dog Guide" website is included in the bookmarks of the user of browser 415. Thus, this website may be of more relevance to the user than the as indicated by the low ranking assigned by the primary search engine.

In contrast to the search results 525, the same user of the browser 405 may choose to perform a search using an enhanced search. For example, FIG. 6 illustrates a screenshot of search results returned using the "beagle adoption" search terms, ranked using the enhanced search method, according to one embodiment of the invention. As shown, the user has entered the same search query terms of "beagle" and "adoption" in text box 510. However, in FIG. 6, the user has chosen to perform an enhanced search using enhanced search button 520. Illustratively, an enhanced search selection box 505 is displayed to the user. In one embodiment, the enhanced search selection box 505 allows the user to specify one or more metadata elements to use in reordering search results of the primary search engine. Specifically, the user has selected the "by bookmarks" and the "by group bookmarks" options. Thus, in this example, search results may be reordered to improve the ranking of websites that are both in the search results and in the bookmarks 405 and 415 of either user. As shown in FIG. 6, search results 530 are listed in a different order. Results that were previously ranked low (or did not even show up) on the list in FIG. 5, are ranked higher in search results 530 of FIG. 6. In this example, results that were also found in the user's list of bookmarks 410 as well as the second user's bookmarks 420 (who is associated with the first user in the same group) are ranked highly in search results 530. For example, the "Beagle Dog Guide" website from bookmarks 420 has climbed to the second position in search results 530 and the "Houston Beagle Rescue" website from bookmarks 410 has climbed to the third position in search results 530.

Advantageously, embodiments of the invention improve the quality of search results returned for a given set of search terms based on metadata associated with the user performing the search. For example, in an enterprise environment, intranet sites bookmarked by related users may be used to increase the ranking of the bookmarked sites, when those sites appear in a search result. Other examples of metadata that could be used to dynamically evaluate a set of search results include bookmarks on a shared bookmarking website, geographic information associated with the bookmarked website or the user, and/or quality of service attributes. In one embodiment, the ranked search results are evaluated by a secondary search engine to enhance the order of search results allowing those results that may be relevant to the user to be displayed at the top of the list, based on the metadata. Further, in addition to bookmarks and other metadata, users may mark documents with tags selected by the user. This may be useful where groups of users share a common interest, job function, or access to a repository of documents searched using a search engine. In such a case, the results of the search engine may be re-ranked based on the tags to promote (or demote) as appropriate search results ranked by the search engine.

While the foregoing is directed to embodiments of the present invention, other and further embodiments of the invention may be devised without departing from the basic scope thereof, and the scope thereof is determined by the claims that follow.

The invention claimed is:

1. A method of enhancing search results generated in response to a search request, comprising:
    receiving a set of search results, wherein the search results list a ranked set of entries, each entry referencing a data object accessible over a network;
    identifying metadata associated with a first user who submitted the search request, wherein the metadata identifies at least one entry in the ranked set of search results, wherein the metadata includes one or more tags, wherein each tag provides a user-specified keyword supplied by a second user describing the content of the data object referenced by the identified entry in the ranked set of search results, and wherein the metadata further includes geographic information associated with the first user;
    adjusting, by use of one or more computer processors, the ranking of the at least one entry, based on the geographic information included in the metadata and the user-specified keyword supplied by the second user; and
    returning the adjusted ranked search results to the first user.

2. The method of claim 1, wherein the metadata further includes at least one bookmark.

3. The method of claim 2, wherein the bookmark is associated with the second user, and wherein the first user and the second user are associated by a common user group.

4. The method of claim 2, wherein the bookmark is retrieved from a social-bookmarking site, and wherein a plurality of users each contributes a respective set of bookmarks to the social-bookmarking site.

5. The method of claim 4, wherein the bookmarks are stored by the social bookmarking site anonymously, relative to a user who contributed one of the respective sets of bookmarks.

6. The method of claim 1, wherein the metadata associated with the first user further includes information identifying a current network quality of service.

7. The method of claim 1, wherein each data object is identified by a Uniform Resource Identifier (URI).

8. The method of claim 7, wherein the URI references a web page.

9. The method of claim 1, wherein the set of search results are received from a primary search engine, wherein the primary search engine is configured to receive a set of search terms and, in response, to identify a set of data objects that include in the search terms and to rank the set of data objects.

10. A computer-readable medium containing a program, which when executed by the processor performs an operation for enhancing search results generated in response to a search request, the operation comprising:
  receiving a set of search results, wherein the search results list a ranked set of entries, each entry referencing a data object accessible over a network;
  identifying metadata associated with a first user who submitted the search request, wherein the metadata identifies at least one entry in the ranked set of search results, wherein the metadata includes one or more tags, wherein each tag provides a user-specified keyword supplied by a second user describing the content of the data object referenced by the identified entry in the ranked set of search results, and wherein the metadata further includes geographic information associated with the first user;
  adjusting the ranking of the at least one entry, based on the geographic information included in the metadata and the user-specified keyword supplied by the second user; and
  returning the adjusted ranked search results to the first user.

11. A system, comprising:
  a processor; and
  a memory containing a search engine program, which when executed on the processor is configured to:
    receive a set of search results, wherein the search results list a ranked set of entries, each entry referencing a data object accessible over a network,
    identify metadata associated with a first user who submitted the search request, wherein the metadata identifies at least one entry in the ranked set of search results, wherein the metadata includes one or more tags, wherein each tag provides a user-specified keyword supplied by a second user describing the content of the data object referenced by the identified entry in the ranked set of search results, and wherein the metadata further includes geographic information associated with the first user,
    adjust the ranking of the at least one entry, based on the geographic information included in the metadata and the user-specified keyword supplied by the second user, and
    return the adjusted ranked search results to the first user.

12. The system of claim 11, wherein the metadata further includes at least one bookmark.

13. The system of claim 12, wherein the bookmark is associated with the second user, and wherein the first user and the second user are associated by a common user group.

14. The system of claim 12, wherein the bookmark is retrieved from a social-bookmarking site, and wherein a plurality of users each contributes a respective set of bookmarks to the social-bookmarking site.

15. The system of claim 14, wherein the bookmarks are stored by the social bookmarking site anonymously, relative to a user who contributed one of the respective sets of bookmarks.

16. The system of claim 11, wherein the metadata associated with the first user further includes information identifying a current network quality of service.

17. The system of claim 11, wherein each data object is identified by a Uniform Resource Identifier (URI).

18. The system of claim 17, wherein the URI references a web page.

19. The system of claim 11, wherein the system further comprises a primary search engine configured to receive a set of search terms and, in response, to identify a set of data objects that include in the search terms and to rank the set of data objects.

* * * * *